(12) United States Patent
Yoshimoto

(10) Patent No.: US 11,146,694 B2
(45) Date of Patent: Oct. 12, 2021

(54) IMAGE FORMING APPARATUS

(71) Applicant: CANON KABUSHIKI KAISHA, Tokyo (JP)

(72) Inventor: Tetsuhiro Yoshimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/070,657

(22) Filed: Oct. 14, 2020

(65) Prior Publication Data

US 2021/0127019 A1 Apr. 29, 2021

(30) Foreign Application Priority Data

Oct. 23, 2019 (JP) .............................. JP2019-192605

(51) Int. Cl.
*H04N 1/00* (2006.01)

(52) U.S. Cl.
CPC ..... *H04N 1/00074* (2013.01); *H04N 1/00042* (2013.01); *H04N 1/0097* (2013.01); *H04N 1/00477* (2013.01)

(58) Field of Classification Search
CPC ........... H04N 1/00074; H04N 1/00477; H04N 1/0097; H04N 1/00042; H04N 1/00002; H04N 1/00029; H04N 1/00037; H04N 1/00039; H04N 2201/0094; G06F 3/121; G06F 3/1234

USPC .................................................. 358/1.14, 1.15
See application file for complete search history.

(56) References Cited

U.S. PATENT DOCUMENTS

| 9,047,033 | B2* | 6/2015 | Hibino .................. G06F 3/1229 |
| 2005/0018241 | A1* | 1/2005 | Azami ................... H04N 1/327 358/1.15 |

FOREIGN PATENT DOCUMENTS

| JP | 2005-237046 | 9/2005 |
| JP | 2005-331722 | 12/2005 |

* cited by examiner

*Primary Examiner* — Kent Yip
(74) *Attorney, Agent, or Firm* — Venable LLP

(57) ABSTRACT

An image forming apparatus includes one or more processors, at least one of the one or more processors operating to: monitor an occurrence of an abnormality; identify, in a case where an abnormality is detected, a failed part that has caused the abnormality, a parent component including one or more child components, a notifier configured to notify failure information indicating a failed part that has caused an abnormality; and a storage configured to store display setting information indicating whether notification of failure information is performed in unit of a child component and in unit of a parent component. The at least one of the one or more processors operates to control, in a case where the display setting information is set so as to notify the failure information in unit of the parent component, when the failed part is a child component.

11 Claims, 9 Drawing Sheets

| | POWER SUPPLY SYSTEM | SIGNAL OUTPUT SYSTEM | DRIVE CIRCUIT SYSTEM | LOAD SYSTEM |
|---|---|---|---|---|
| FIXING MOTOR ROTATION ABNORMALITY | +24V_FU | MOTOR CONTROLLER | MOTOR DRIVER | FIXING DRIVE MOTOR |

| PARENT COMPONENT | PARENT COMPONENT CODE | CHILD COMPONENT | CHILD COMPONENT CODE | SUBSTITUTION INHIBITION FLAG |
|---|---|---|---|---|
| FIXING DEVICE | 100-0000 | FILM UNIT | 100-0001 | OFF |
| | | PRESSURE ROLLER | 100-0002 | OFF |
| | | SHUTTER UNIT | 100-0003 | OFF |
| GEAR UNIT | 200-0000 | | | |
| ELECTRIC PART | 300-0000 | FIXING DRIVE MOTOR | 300-0001 | ON |
| ELECTRIC BOARD | 400-0000 | CONTROL BOARD | 400-0001 | ON |
| | | DRIVER BOARD | 400-0002 | ON |
| | | POWER SUPPLY BOARD | 400-0003 | ON |

IMAGE FORMING APPARATUS

BACKGROUND OF THE INVENTION

Field of the Invention

The present disclosure relates to a technology of identifying, in a case where an abnormality has occurred in operation of an image forming apparatus such as a copying machine or a printer, a failure spot being a cause of the abnormality.

Description of the Related Art

An image forming apparatus is configured to form an image on a sheet by causing a plurality of component parts to operate in cooperation with one another. The operation of each component part is controlled individually. In a case where the operation control is not finished normally, the image forming apparatus notifies occurrence of an abnormality by displaying an error code or transmitting an error code to a call center via a network. A service person of the image forming apparatus repairs the image forming apparatus based on the error code. In this manner, service support for recovering the operation of the image forming apparatus to a normal state is operated.

When repairing an image forming apparatus based on an error code, the service person appropriately checks a failure of a component part related to the error code at the site, and identifies a failure spot required to be repaired. A large amount of time is required for repairing the image forming apparatus, which forces a user to feel inconvenience while the image forming apparatus is being repaired. In Japanese Patent Application Laid-open No. 2005-237046, there is disclosed a method of identifying a failure spot, which involves distinguishing between failures of a high-voltage power supply and a charging wire, to thereby distinguish between a failure of a load and a failure of the apparatus itself. In Japanese Patent Application Laid-open No. 2005-331722, there is disclosed a method of displaying a cause of a failure in a case where a failure spot is identified. Such a method of identifying a failure spot is used to reduce work hours of repair by the service person.

Functions of an image forming apparatus are achieved by a plurality of parent functional units (parent components) including a fixing device and a toner replenisher. The parent component is formed by combining a plurality of child parts (child components). With respect to an apparatus thus formed of a plurality of functional units, in a case where a failure occurs, a part level (e.g., in a unit of a parent component or in unit of a child component) at which a repair is performed differs depending on a type of operating base, for example, a local community or a company and the like. Accordingly, it is required to notify an occurrence of an abnormality depending on the part level required by the operating base. Therefore, the present disclosure provides an image forming apparatus capable of changing a level at which the occurrence of an abnormality is to be notified.

SUMMARY OF THE INVENTION

An image forming apparatus according to the present disclosure includes: one or more processors, at least one of the one or more processors operating to: monitor an occurrence of an abnormality; identify, in a case where an abnormality is detected, a failed part that has caused the abnormality, a parent component including one or more child components; a notifier configured to notify failure information indicating a failed part that has caused an abnormality; and a storage configured to store display setting information indicating whether notification of failure information is performed in unit of a child component and in unit of a parent component; wherein the at least one of the one or more processors operates to: control, in a case where the display setting information is set so as to notify the failure information in unit of the parent component, when the failed part is a child component, the notifier to notify the failure information on the parent component including the failed part; and control, in a case where the display setting information is set so as to notify the failure information in unit of the child component, the notifier to notify the failure information on the failed part.

Further features of the present invention will become apparent from the following description of exemplary embodiments (with reference to the attached drawings).

DESCRIPTION OF THE EMBODIMENTS

Now, at least one embodiment of the present disclosure is described in detail with reference to the accompanying drawings.

Image Forming Apparatus

Figure 1:
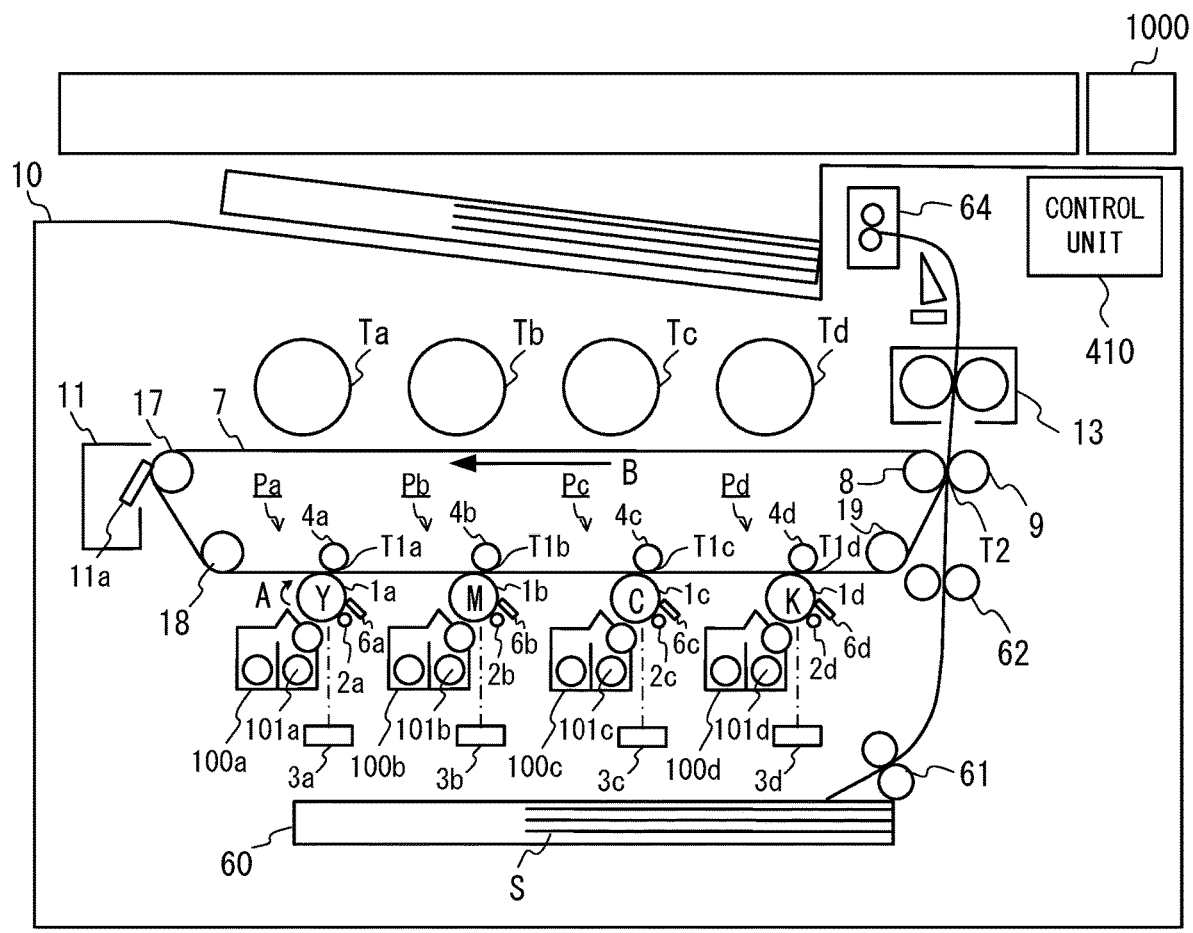
FIG. 1 is a configuration diagram of an image forming apparatus according to at least one embodiment of the present disclosure.

FIG. 1 is a configuration diagram of an image forming apparatus according to at least one embodiment of the present disclosure. An image forming apparatus 10 according to at least one embodiment is configured to form a color image on a sheet S by an electrophotographic method. The image forming apparatus 10 has a built-in control unit 410 configured to perform operation control. The image forming apparatus 10 also includes an operating panel 1000. The operating panel 1000 is a user interface including an input device and an output device. The input device includes a numeric keypad, key buttons, for example, input keys, and a touch panel. The output device includes a display and a speaker.

The image forming apparatus 10 is an intermediate transfer tandem system in which four image forming units Pa to Pd corresponding to four colors are arranged along the intermediate transfer belt 7. The intermediate transfer tandem system has become the mainstream in recent years due to its high productivity and capability of handling conveyance of various types of sheets S. Images (toner images) are formed on the intermediate transfer belt 7 by the image forming units Pa to Pd. The intermediate transfer belt 7 is rotated in a direction indicated by an arrow B to convey the formed toner images to a secondary transfer portion T2.

The image forming apparatus 10 includes a sheet storage 60 configured to store sheets S on each of which an image is to be formed. The sheet S is fed from the sheet storage 60 by sheet feeding rollers 61. The sheet S fed by the sheet feeding rollers 61 is conveyed along a conveying path. Registration rollers 62 are provided to the conveying path. The registration rollers 62 are configured to perform skew feed correction on the conveyed sheet S to convey the sheet S to the secondary transfer portion T2 in accordance with image forming timings of the image forming units Pa to Pd. The secondary transfer portion T2 is a transfer nip portion formed by a secondary transfer inner roller 8 and a secondary transfer outer roller 9, which are opposed to each other. The secondary transfer portion T2 causes the toner image on the intermediate transfer belt 7 to be transferred onto the sheet S by a predetermined pressurizing force and an electrostatic load bias.

An image forming operation (image formation process) to be performed by the image forming units Pa to Pd is described. The image forming units Pa to Pd in at least one embodiment are provided in four sets corresponding to four colors of yellow (Y), magenta (M), cyan (C), and black (K), respectively. However, the number of colors is not limited to four. There are also provided image forming units corresponding to the number of colors.

The image forming units Pa to Pd include photosensitive members 1a to 1d, chargers 2a to 2d, exposure devices 3a to 3d, developing devices 100a to 100d, developing containers 101a to 101d, primary transfer rollers 4a to 4d, and photosensitive member cleaners 6a to 6d, respectively. The photosensitive members 1a to 1d each have a drum shape, and are each driven to rotate in a direction indicated by an arrow A about a drum shaft. The chargers 2a to 2d uniformly charge surfaces of the rotating photosensitive members 1a to 1d, respectively. The exposure devices 3a to 3d expose the charged surfaces of the photosensitive members 1a to 1d, respectively, with laser light modulated based on image information indicating an image to be formed. An exposure position of the laser light is moved with a drum axis direction as a main scanning direction. When the exposure position of the laser light is moved in the main scanning direction and each of the photosensitive members 1a to 1d is rotated, an electrostatic latent image corresponding to one page is formed on the surface of each of the photosensitive members 1a to 1d.

The developing devices 100a to 100d perform development by causing toner to adhere to the electrostatic latent images formed on the surfaces of the photosensitive members 1a to 1d, respectively. Toner storage containers Ta to Td removably attached to the image forming apparatus 10 are provided corresponding to the developing devices 100a to 100d, respectively. In the developing devices 100a to 100d, in a case where amounts of toner (non-magnetic toner) stored in the developing containers 101a to 101d are lowered, toner is replenished from the toner storage containers Ta to Td, respectively.

Toner images are formed on the photosensitive members by development processing performed by the developing devices 100a to 100d as follows. A yellow toner image is formed on the photosensitive member 1a. A magenta toner image is formed on the photosensitive member 1b. A cyan toner image is formed on the photosensitive member 1c. A black toner image is formed on the photosensitive member 1d.

The toner images formed on the photosensitive members 1a to 1d are transferred to the intermediate transfer belt 7 by a predetermined pressurizing force and a bias voltage applied by the primary transfer rollers 4a to 4d, respectively. The transfer is performed at timings corresponding to rotation of the intermediate transfer belt 7. Therefore, the toner images of the respective colors are transferred onto the intermediate transfer belt 7 in a superimposed manner. Transfer residual toner remaining on the photosensitive members 1a to 1d after the transfer is collected by the photosensitive member cleaners 6a to 6d, respectively. This allows the photosensitive members 1a to 1d to be ready for the next image forming process.

An operation of the intermediate transfer belt 7 is described. The intermediate transfer belt 7 is provided to an intermediate transfer belt frame (not shown). The intermediate transfer belt 7 has an endless shape, and is looped around the secondary transfer inner roller 8, which also serves as a driver, and a tension roller 17 and a secondary transfer upstream roller 18, which are driven rollers. In order to superimpose the toner image on the intermediate transfer belt 7, the image forming process is performed by the image forming units Pa to Pd in parallel at the timings corresponding to a rotation speed of the intermediate transfer belt 7. Finally, a full-color toner image is formed on the intermediate transfer belt 7, and conveyed to the secondary transfer portion T2. The transfer residual toner on the intermediate transfer belt 7 after the transfer at the secondary transfer portion T2 is collected by a blade 11a of the transfer cleaner 11.

The sheet S onto which the toner image has been transferred at the secondary transfer portion T2 is conveyed to a fixing device 13. The fixing device 13 includes two rollers facing each other. The two rollers form a fixing nip. The fixing device 13 applies a predetermined pressurizing force and heat quantity to the sheet S passing through the fixing nip to melt and fix the toner image onto the sheet S. The fixing device 13 includes a fixing heater serving as a heat source in order to heat the sheet S. The fixing heater is controlled by the control unit 410 so as to maintain an optimum temperature at all times. The sheet S onto which the toner image has been fixed is discharged to the outside of the image forming apparatus 10 as a printed product.

Figure 2A:
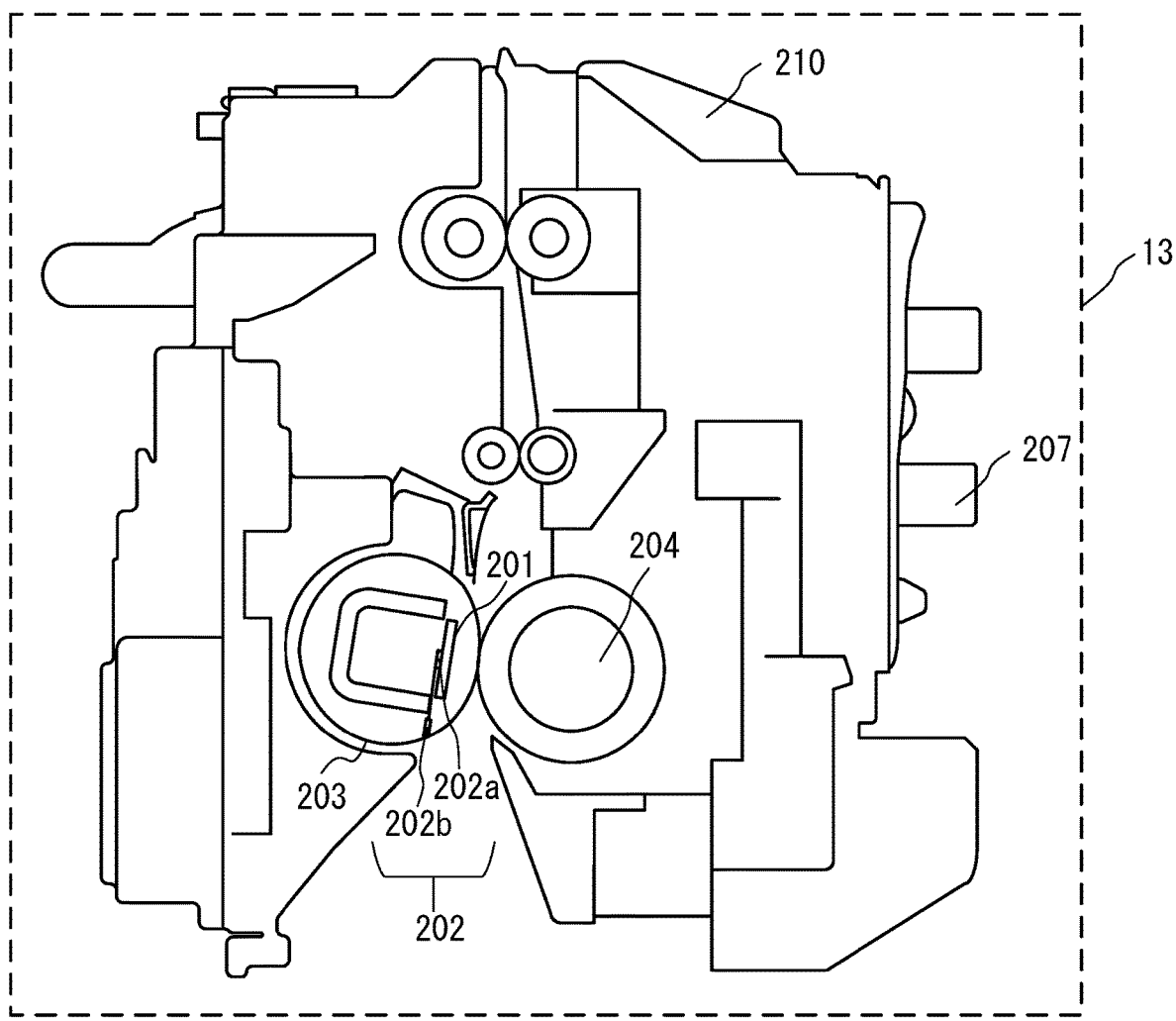
FIG. 2A and FIG. 2B are explanatory diagrams of a fixing device.
Figure 2B:
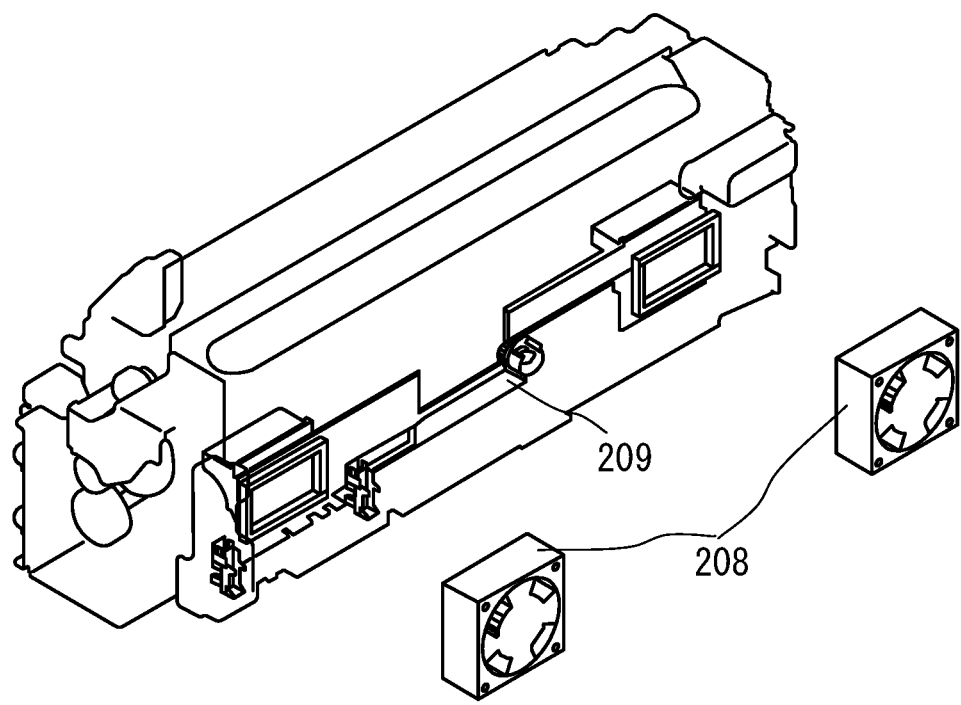

FIG. 2A and FIG. 2B are explanatory diagrams of the fixing device 13. FIG. 2A is an internal configuration diagram of the fixing device 13. FIG. 2B is an external perspective view of the fixing device 13.

The fixing device 13 includes: a film unit 203 having a built-in fixing heater 201; and a pressure roller 204 configured to be urged toward a direction in which the film unit 203 exists. The pressure roller 204 is driven to rotate by a drive force transmitted from the outside. A thermistor 202 for detecting a temperature is provided inside the film unit 203. The sheet S has the toner image melted and fixed while passing through the fixing nip formed by the film unit 203 and the pressure roller 204.

The fixing heater 201 is a heat source obtained by printing a heating pattern on a ceramic substrate. The fixing heater 201 has high responsiveness and can increase in temperature by, for example, about 50° C. in one second. The film unit 203 includes the fixing heater 201 by a fixing film. The fixing film has a metal as a base material, and a rubber layer subjected to a fluorine surface treatment processing of about 300 μm is formed on the base material. The fixing film has an extremely small heat capacity, and transfers heat of the fixing heater 201 only to the fixing nip. The pressure roller 204 is a rotating member having a hardness of about 60 degrees, and frictionally drives the film unit 203. The thermistor 202 includes a main thermistor 202*a* for detecting a heater temperature for performing fixing control, and a sub-thermistor 202*b* for detecting a temperature rise of a film in its sheet non-passing portion when, for example, a small-size sheet is passed therethrough.

The fixing device 13 further includes a shutter unit 207 for cooling an end portion of the fixing heater 201. The shutter unit 207 includes cooling fans 208 and a cooling shutter 209 for varying a range of cooling by the cooling fans 208. The shutter unit 207 can control a cooling range and a cooling amount for the fixing heater 201 by controlling a fan airflow rate of the cooling fans 208 and an opening amount of the cooling shutter 209. With this configuration, it is possible to prevent productivity from decreasing due to a temperature rise in a sheet non-passing region of the fixing heater 201.

Figure 3:
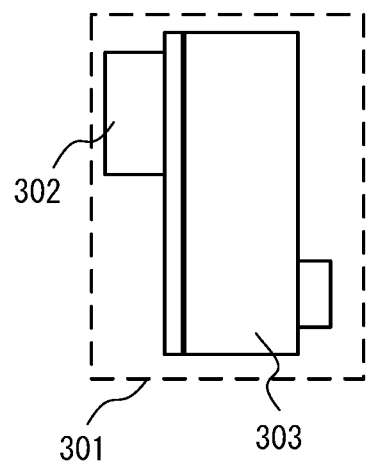
FIG. 3 is an explanatory configuration diagram of a fixing drive unit.

FIG. 3 is an explanatory configuration diagram of a fixing drive unit configured to control a rotational operation of the pressure roller 204 of the fixing device 13 in accordance with an instruction issued by the control unit 410. A fixing drive unit 301 includes: a fixing drive motor 302 to be driven to rotate based on a control signal acquired from the control unit 410; and a gear unit 303 configured to transmit a drive force of the fixing drive motor 302 to the fixing device 13. When the fixing drive motor 302 is driven in a forward direction, the pressure roller 204 of the fixing device 13 is driven to rotate. When the fixing drive motor 302 is driven in a reverse direction, the pressure roller 204 is prevented from applying pressure on the film unit 203. With this configuration, the pressure roller 204 can apply pressure on the film unit 203 during the image forming operation, and can stop applying pressure on the film unit 203 during an image non-forming operation.

Controller

Figure 4:
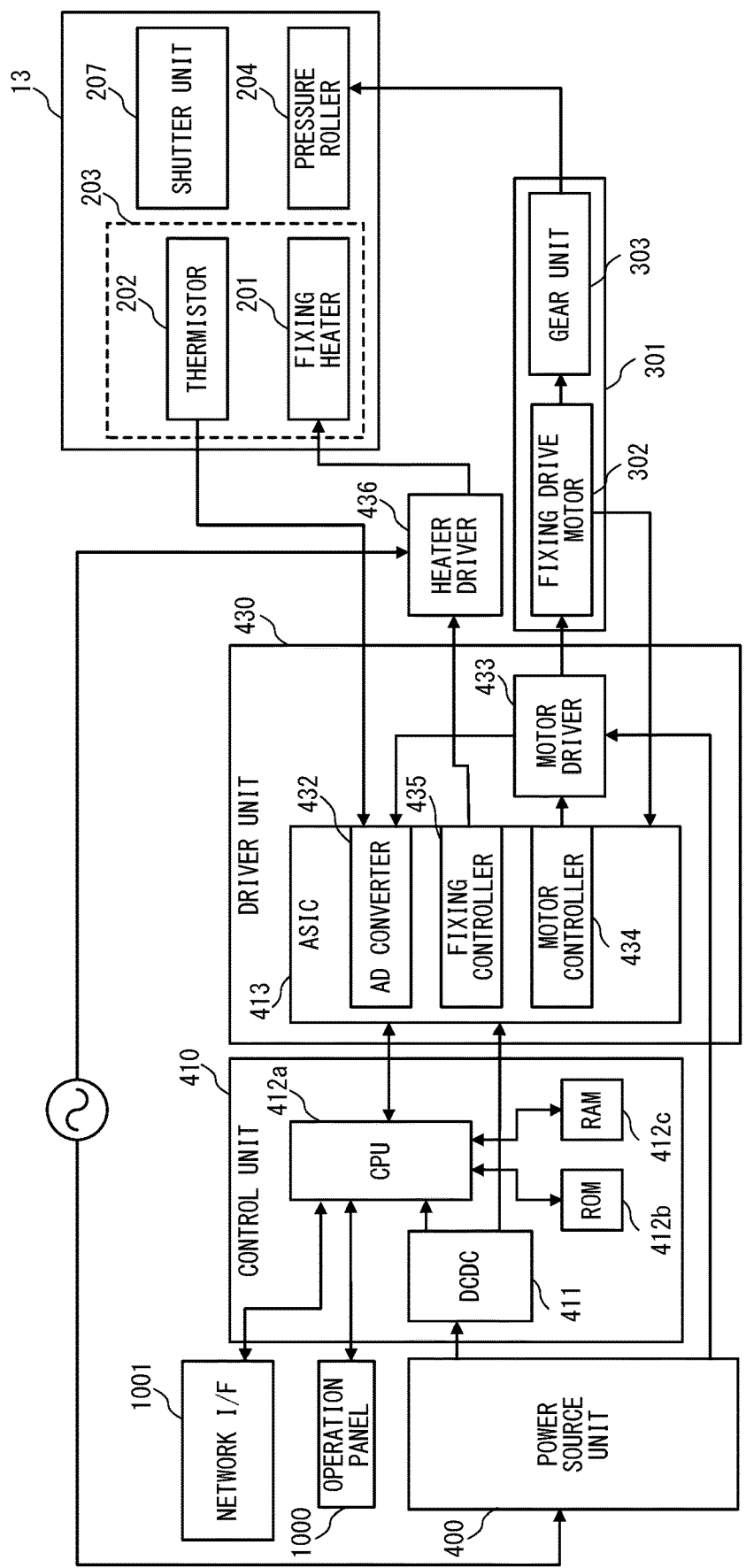
FIG. 4 is an explanatory diagram of a controller.
Figure 5:
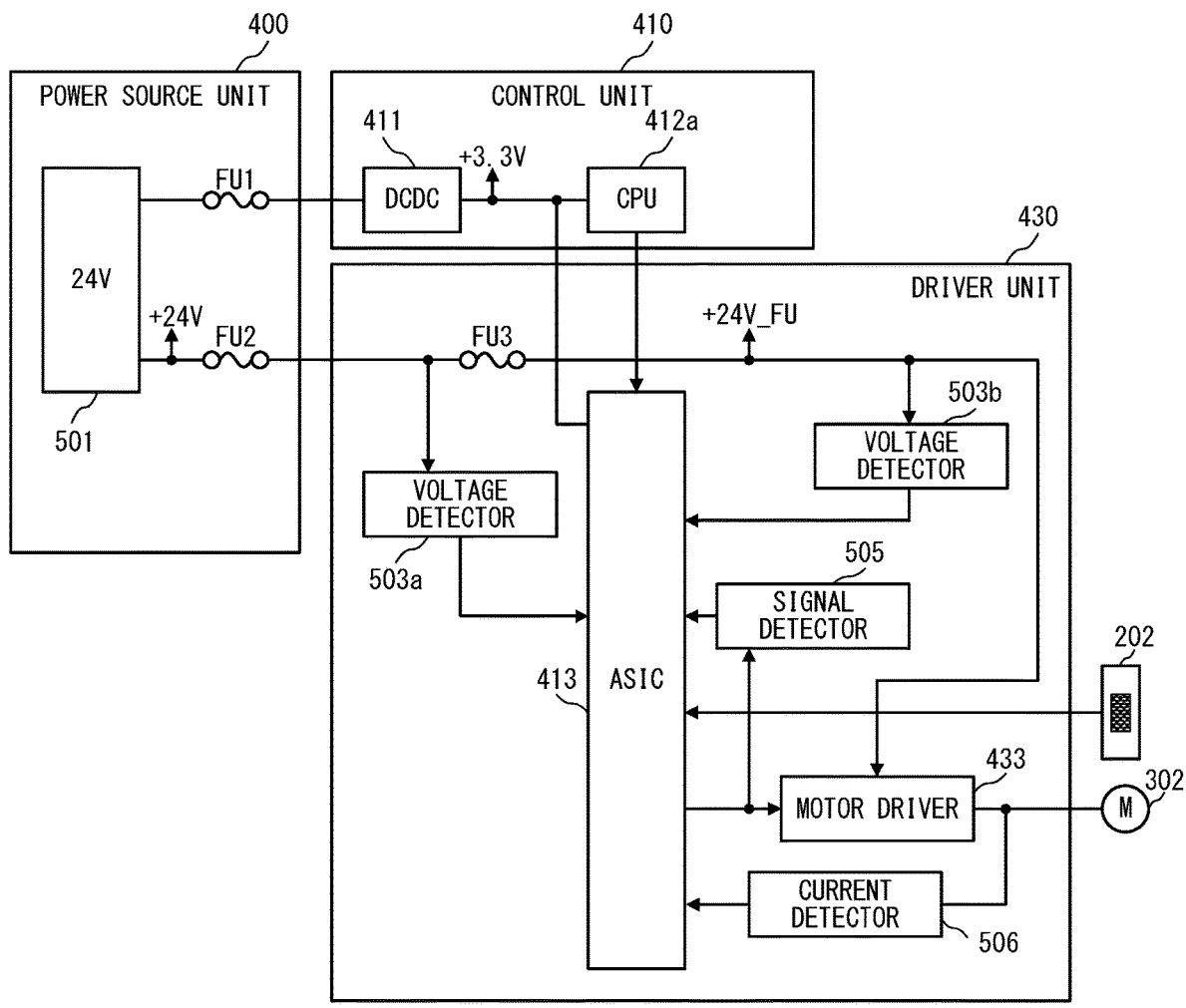
FIG. 5 is an explanatory diagram of the controller.

FIG. 4 and FIG. 5 are explanatory diagrams of a controller for the fixing device 13 of the image forming apparatus 10.

A power source unit 400 includes fuses FU1 and FU2. The control unit 410 includes a DC/DC converter 411, a central processing unit (CPU) 412*a*, a read only memory (ROM) 412*b*, and a random access memory (RAM) 412*c*. The driver unit 430 includes an application specific integrated circuit (ASIC) 413, a motor driver 433, and a fuse FU3 in order to drive the fixing drive motor 302. The driver unit 430 also includes voltage detectors 503*a* and 503*b*, a signal detector 505, and a current detector 506 in order to identify a failure spot described later.

A power supply system is described. The power source unit 400 is configured to output a power source voltage of +24 V (hereinafter referred to as "+24 V voltage"). The power source unit 400 is also configured to distribute the power source voltage to supply power to each component part via the fuse FU1 and the fuse FU2. The control unit 410 is configured to step down the +24 V voltage supplied from the power source unit 400 via the fuse FU1 to a voltage of 3.3 V (hereinafter referred to as "+3.3 V voltage") by the DC/DC converter 411. The 3.3 V voltage is supplied to, for example, the CPU 412*a* and the driver unit 430 (ASIC 413). The driver unit 430 is configured to protect the +24 V voltage supplied from the power source unit 400 via the fuse FU2 by the fuse FU3 to supply power to the motor driver 433.

Now, the control unit 410 is described. In the control unit 410, the CPU 412*a* executes a computer program stored in the ROM 412*b*, to thereby control an operation of each component part and execute various kinds of control sequences relating to image formation. At this time, the RAM 412*c* is used as a working memory, and stores rewritable data that is to be stored temporarily or permanently. The RAM 412*c* stores, for example, drive setting information on a detachable unit and information on a usage amount of toner. The CPU 412*a* performs serial communication to/from the ASIC 413. The CPU 412*a* uses the serial communication to perform a read/write operation for a register or RAM inside the ASIC 413, to thereby control the operation of the ASIC 413.

The driver unit 430 in at least one embodiment includes the ASIC 413 to output a signal for controlling driving of the fixing heater 201 and a fixing drive motor 302. The ASIC 413 includes functional modules including an AD converter 432 configured to convert an analog signal value into a digital signal, a motor controller 434 configured to control the fixing drive motor 302, and a fixing controller 435 configured to control a temperature of the fixing heater 201. The ASIC 413 is configured to acquire a set value from the CPU 412*a* to set each functional module based on the set value. Each functional module outputs a control signal when a logic circuit operates based on the set value. In at least one embodiment, the motor controller 434 is configured to output a control signal (motor control signal) for controlling an operation of the motor driver 433. The fixing controller 435 is configured to output a control signal (temperature control signal) for controlling the temperature of the fixing heater 201.

The motor driver 433 is configured to control an operation of the fixing drive motor 302, which serves as a load to be controlled, based on the power source voltage supplied from the power source unit 400 and the control signal output from the motor controller 434.

The motor driver 433 includes a driver integrated circuit (IC) for driving the fixing drive motor 302. The driver IC is configured to control rotation of the fixing drive motor 302 based on the motor control signal for driving the fixing drive motor 302. The motor control signal includes a rotation direction, a speed, a drive mode, and other such information on the fixing drive motor 302. As described above, in a case where the fixing drive motor 302 is rotated in the forward direction, the pressure roller 204 is rotated. In a case where the fixing drive motor 302 is rotated in the reverse direction, an amount of pressure applied between the film unit 203 and the pressure roller 204 is changed. The CPU 412*a* is configured to acquire a rotation speed of the fixing drive motor 302 via the ASIC 413. In a case where the rotation speed is not within a predetermined range while the fixing drive motor 302 is performing forward or reverse rotation drive, the CPU 412*a* determines that an abnormality has occurred in the rotation control for the fixing drive motor 302.

The CPU 412*a* is also configured to perform temperature control on the fixing heater 201 by the fixing controller 435. The CPU 412*a* performs proportional-integral-differential controller (PID) control on electric power applied to the fixing heater 201 based on the temperature of the fixing heater 201 detected by the thermistor 202. Thus, the temperature of the fixing heater 201 is adjusted to a target temperature. The CPU 412*a* acquires the temperature of the fixing heater 201 via the ASIC 413. In a case where the temperature of the fixing heater 201 is not within a predetermined range, the CPU 412*a* determines that an abnormality has occurred in the temperature control for the fixing heater 201.

The CPU 412a monitors an occurrence of a control abnormality based on the rotation speed of the fixing drive motor 302 and the temperature of the fixing heater 201 while performing such various kinds of control. The CPU 412a, which has determined that a control abnormality has occurred, performs failure spot identifying processing for identifying the failure spot that has caused the abnormality.

The CPU 412a is connected to the operating panel 1000 and a network interface (I/F) 1001. The CPU 412a acquires an input signal, for example, an instruction from the operating panel 1000, and displays a screen on the operating panel 1000. The CPU 412a performs communication to/from an external device, for example, a computer, by the network I/F 1001 via a predetermined network. It is noted that functions achieved by the ASIC 413 may be achieved by a CPU(s) or an MPU(s).

Failure Spot Identifying Processing

Figures 6A, 6B:
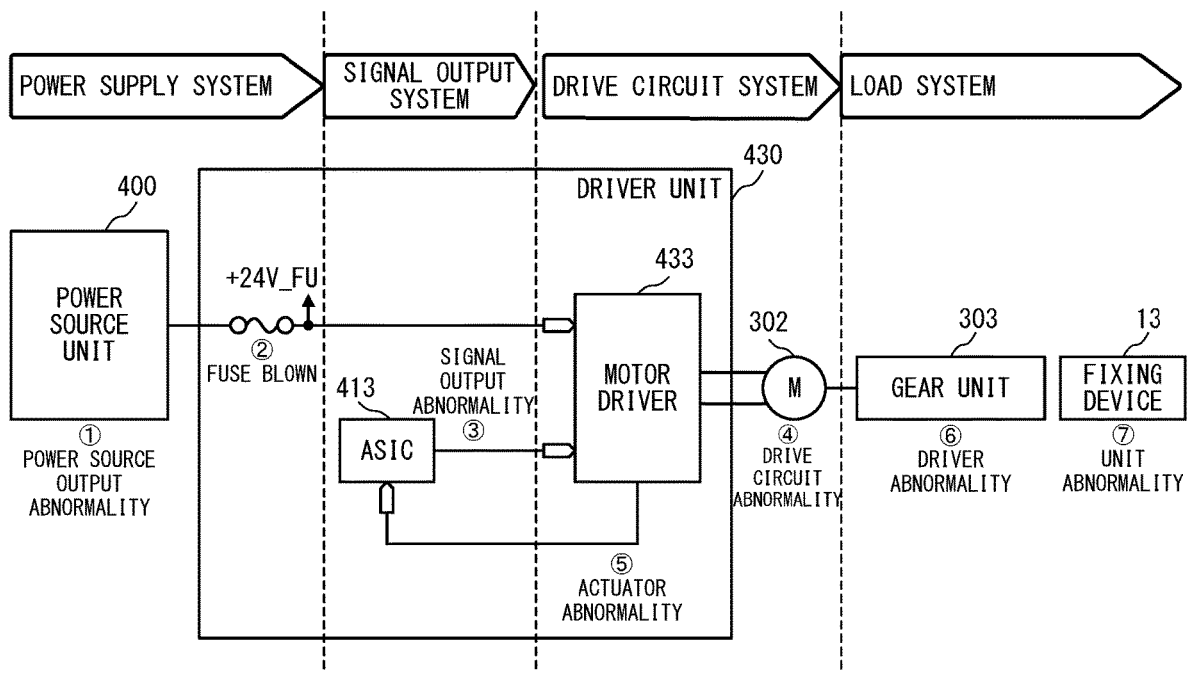
FIG. 6A and FIG. 6B are an explanatory table and an explanatory diagram, respectively, of failure spot identifying processing.

FIG. 6A and FIG. 6B are an explanatory table and an explanatory diagram, respectively, of the failure spot identifying processing in at least one embodiment. FIG. 6A is a failure spot identification table showing possible failure spots for showing a spot that may cause a failure in each of the power supply system, a signal output system, a drive circuit system, and a load system in a case where an abnormality has occurred in the rotation control for the fixing drive motor 302. The image forming apparatus 10 stores in advance the failure spot identification table in the RAM 412c of the control unit 410. In a case where a control abnormality has occurred, the CPU 412a refers to each piece of failure spot identification information in the failure spot identification table to identify the failure spot, to thereby identify a component part having the failure spot as a failed part. FIG. 6B is an explanatory diagram of failure spots. The failure spot identification is performed by examining the failure spots in the order of the power supply system, the signal output system, the drive circuit system, and the load system. The failure spot identifying processing to be performed in a case where a control abnormality in the fixing drive motor 302 has occurred is as follows.

First, the CPU 412a examines whether or not there is a failure spot in the power supply system. In a case where a control abnormality has occurred in the fixing drive motor 302, the CPU 412a performs a voltage check for a voltage involved in passage through the fuse FU3 (hereinafter referred to as "+24 V_FU voltage") in order to determine presence or absence of a failure spot in the power supply system. For the voltage check of the +24 V_FU voltage, the voltage detector 503a of the driver unit 430 determines whether or not the +24 V voltage before the passage through the fuse FU3 is equal to or larger than a predetermined value (threshold value). In this case, the threshold value is set to 18 V.

A determination result obtained by the voltage detector 503a is transmitted to the CPU 412a via the ASIC 413. The CPU 412a examines a failure spot based on the determination result obtained by the voltage detector 503a. In a case where the determination result indicates that the +24 V voltage is equal to or higher than 18 V, the CPU 412a determines that an output (+24 V voltage) of a power source (power source unit 400) is normal. In a case where the determination result indicates that the +24 V voltage is lower than 18 V, the CPU 412a determines that the output (+24 V voltage) of the power source unit 400 is abnormal. When determining that the output of the power source unit 400 is abnormal, the CPU 412a determines that the failure spot is a path (fuse FU2) for outputting the +24 V voltage of the power source unit 400. In this case, the CPU 412a identifies the power source unit 400 as the failed part (power source output abnormality).

In a case where the +24 V voltage is normal, the voltage detector 503b of the driver unit 430 determines whether or not the +24 V_FU voltage involved in the passage through the fuse FU3 is equal to or higher than a predetermined value (threshold value). The voltage detector 503b performs determination processing in the same manner as the voltage detector 503a to transmit a determination result to the CPU 412a via the ASIC 413. The CPU 412a determines whether or not the +24 V_FU voltage is normal based on a determination result obtained by the voltage detector 503b. When determining that the +24 V_FU voltage is abnormal, the CPU 412a determines that the failure spot is the fuse FU3. In this case, the CPU 412a identifies the driver unit 430 as the failed part (fuse blown). When determining that the +24 V voltage and the +24 V_FU voltage are normal, the CPU 412a determines that the power supply system is normal.

In a case where the power supply system is normal, the CPU 412a examines whether or not there is a failure spot in the signal output system. The CPU 412a checks a control signal (motor control signal) transmitted from the motor controller 434 of the ASIC 413 to the motor driver 433 in order to examine a failure spot in the signal output system. In order to check the motor control signal, the CPU 412a first sets the ASIC 413 so as to output each control signal at a high level. The signal detector 505 of the driver unit 430 compares a voltage value of each control signal with a predetermined threshold value. In this case, the threshold value is set to 2.8 V.

A comparison result obtained by the signal detector 505 is transmitted to the CPU 412a via the ASIC 413. The CPU 412a examines the output state of a motor control signal based on the comparison result obtained by the signal detector 505. In a case where the comparison result indicates the fact that the value of the motor control signal is equal to or larger than 2.8 V, the CPU 412a determines that the control signal is normal. In a case where the comparison result indicates the fact that the value of the motor control signal is smaller than 2.8 V, the CPU 412a determines that the motor control signal is abnormal. When determining that the motor control signal is abnormal, the CPU 412a identifies the motor controller 434 as the failure spot. In this case, the CPU 412a identifies the driver unit 430 as the failed part (signal output abnormality).

Subsequently, the CPU 412a sets the ASIC 413 so as to output each control signal at a low level. The signal detector 505 compares a voltage value of each control signal with a predetermined threshold value. In this case, the threshold value is set to 0.8 V.

The comparison result obtained by the signal detector 505 is transmitted to the CPU 412a via the ASIC 413. The CPU 412a examines the output state of the motor control signal based on the comparison result obtained by the signal detector 505. When the comparison result indicates the fact that the value of the motor control signal is smaller than 0.8 V, the CPU 412a determines that the motor control signal is normal. In a case where the comparison result indicates the fact that the value of the motor control signal is equal to or larger than 0.8 V, the CPU 412a determines that the motor control signal is abnormal. When determining that the motor control signal is abnormal, the CPU 412a identifies the motor controller 434 as the failure spot. In this case, the CPU 412a identifies the driver unit 430 as the failed part (signal output system abnormality).

In a case where the power supply system and the signal output system are normal, the CPU 412a examines whether or not there is a failure spot in the drive circuit system. The CPU 412a checks the output of the motor driver 433 in order to examine a failure spot in the drive circuit system. In order to check the output of the motor driver 433, the CPU 412a first sets the motor controller 434 of the ASIC 413 so as to operate the fixing drive motor 302. The ASIC 413 (motor controller 434) transmits a motor control signal for operating the fixing drive motor 302 to the motor driver 433.

The current detector 506 of the driver unit 430 detects an output current from the motor driver 433 with the power source voltage (+24 V_FU voltage) and the motor control signal being input to the motor driver 433. The current detector 506 compares a current value of a current flowing from the motor driver 433 to the fixing drive motor 302 with a threshold value in order to determine whether or not the motor driver 433 is abnormal. In this case, the threshold value is set to 100 mA.

A comparison result obtained by the current detector 506 is transmitted to the CPU 412a via the ASIC 413. The CPU 412a examines a failure spot based on the comparison result obtained by the current detector 506. The CPU 412a determines that the motor driver 433 is normal in a case where the comparison result indicates that the value of a current flowing through the fixing drive motor 302 is equal to or larger than 100 mA. The CPU 412a determines that the motor driver 433 is abnormal in a case where the comparison result indicates that the value of the current flowing through the fixing drive motor 302 is smaller than 100 mA.

At this time, the CPU 412a determines that the failed part is the driver unit 430 in a case where the fixing drive motor 302 is operating. In a case where the fixing drive motor 302 is not operating, the CPU 412a determines that the failure spot is an actuator (actuator abnormality), and identifies the fixing drive motor 302 as the failed part.

In a case where the failure spot has been successfully identified in the failure spot identifying processing performed so far, the CPU 412a notifies the failed part identified by the operating panel 1000. For example, the CPU 412a displays information indicating the failed part on the display of the operating panel 1000. In a case where the failed part has not been successfully identified, the CPU 412a further performs the next failure spot identifying processing.

In a case where the power supply system, the signal output system, and the drive circuit system are normal, the CPU 412a examines whether or not there is a failure spot in the load system. The CPU 412a examines an operation of the load system by performing the rotation control for the fixing drive motor 302 again. The CPU 412a detects the rotation speed of the fixing drive motor 302 based on a frequency generator (FG) signal of the fixing drive motor 302 in order to examine the operation of the load system. In a case where the fixing drive motor 302 is not operating at a predetermined rotation speed, the CPU 412a determines that a motor lock abnormality has occurred due to an excessive torque generated in the gear unit 303 or the fixing device 13 connected to the fixing drive motor 302.

In a case where the CPU 412a determines that there is no abnormality in the fixing drive motor 302, the CPU 412a determines whether a failure has occurred in any one of parts (child components) that form the fixing device 13 based on a motor current flowing through the fixing drive motor 302.

For example, in a case where the value of the motor current of the fixing drive motor 302 is equal to or larger than 100 mA and smaller than 2,000 mA, the CPU 412a determines that the film unit 203 is abnormal. In a case where the value of the motor current of the fixing drive motor 302 is equal to or larger than 2,000 mA and smaller than 3,000 mA, the CPU 412a determines that the pressure roller 204 is abnormal. In a case where the value of the motor current of the fixing drive motor 302 is equal to or larger than 3,000 mA, the fixing drive motor 302 is in a locked state, and hence the CPU 412a cannot determine which part has failed. Therefore, the CPU 412a determines that the pressure roller 204 or the film unit 203 in the fixing device 13 is abnormal.

With those operations, it is possible to determine which of the fixing drive motor 302 and the pressure roller 204 has caused the motor lock abnormality.

Notification of Result of Failure Spot Identifying Processing

Figure 7A:
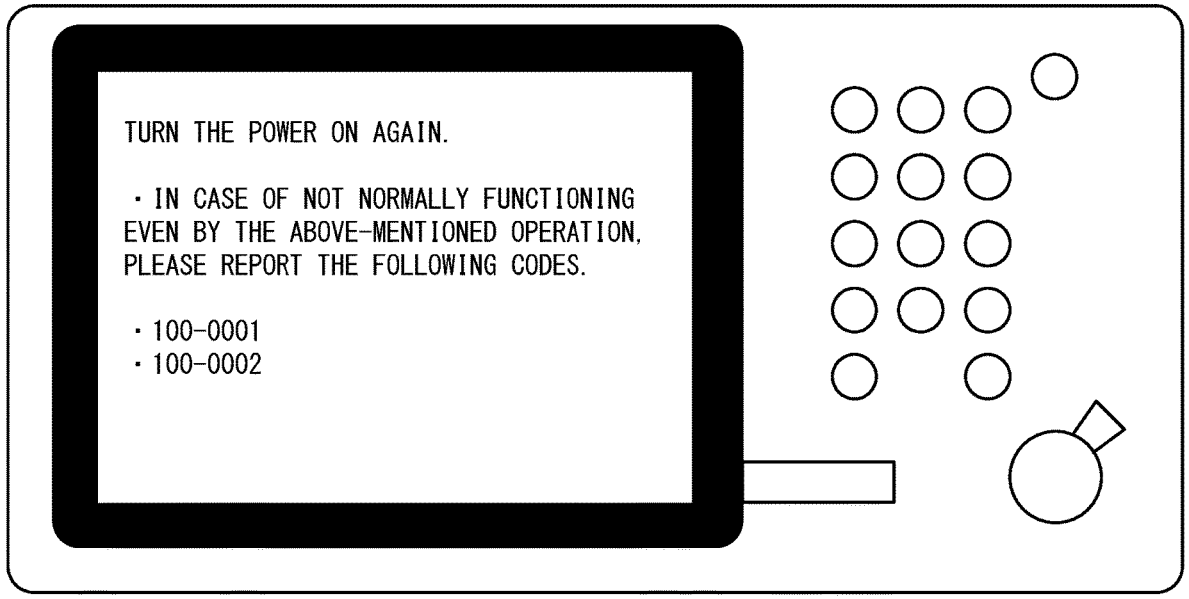
FIG. 7A and FIG. 7B are views for exemplifying a notification screen.
Figure 7B:
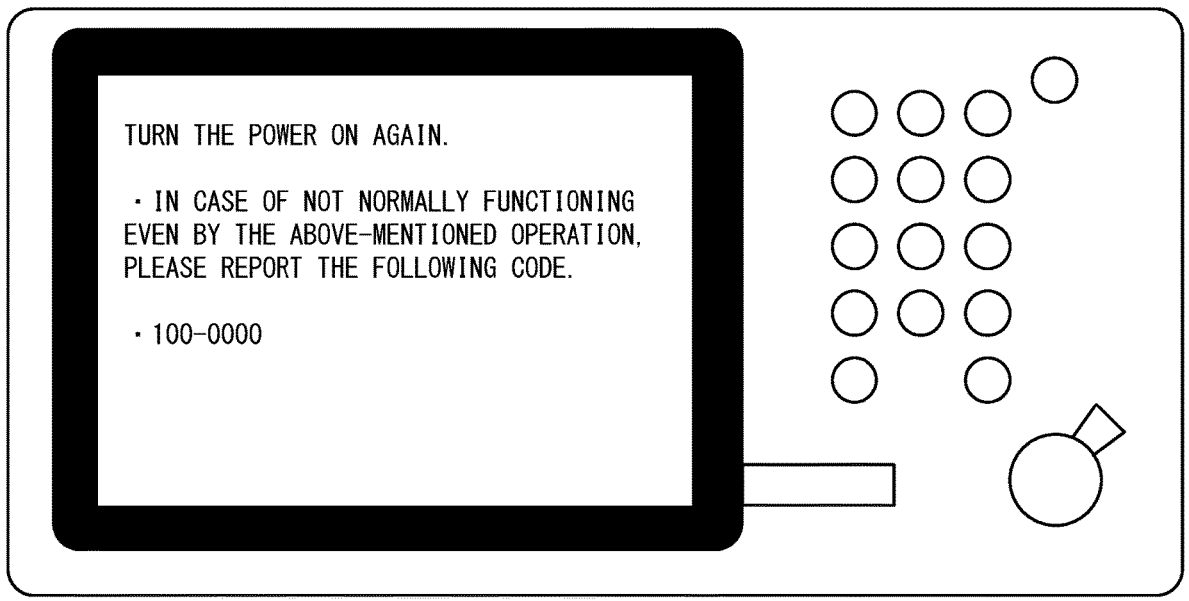

As described above, the failure spot identifying processing for the control abnormality in the fixing drive motor 302 is performed. The CPU 412a notifies a processing result (identified failed part) after execution of the failure spot identifying processing. FIG. 7A and FIG. 7B are views for exemplifying notification screens to be displayed in a case where a failed part is notified through use of the display of the operating panel 1000. FIG. 7A is an exemplary illustration of the notification screen to be displayed in a case where the film unit 203 and the pressure roller 204 have been determined as the failed parts. In FIG. 7A, "100-0001" is a child component code indicating the film unit 203, and "100-0002" is a child component code indicating the pressure roller 204. FIG. 7B is an exemplary illustration of the notification screen to be displayed in a case where the fixing device 13 has been determined as the failed part. In FIG. 7B, "100-0000" is a parent component code indicating the fixing device 13. In this case, the "child component code" is a component code assigned to a child component, and the "parent component code" is a component code assigned to a parent functional unit (parent component). The parent component is a component part of the image forming apparatus 10 including one or more child components. For example, the fixing device 13 is a parent component, and the film unit 203 and the pressure roller 204 that form the fixing device 13 are child components. The "parent component code" and the "child component code" are examples of the failure information.

In FIG. 7A, the identified failed part is explicitly indicated. In this example, the operating panel 1000 explicitly indicates that it is required to replace the child components (film unit 203 and pressure roller 204) inside the fixing device 13. This allows a service person to bring the child components (film unit 203 and pressure roller 204) inside the fixing device 13 and replace the notified child components. Therefore, it is possible to recover the image forming apparatus 10 from a failure state while reducing cost of parts required for a repair.

In FIG. 7B, after the CPU 412a identifies the child component inside the fixing device 13 as the failed part, the fixing device 13 being the parent component is explicitly indicated as the failed part. This allows the service person to bring the fixing device 13 (parent component) and replace the fixing device 13 with a new fixing device 13 without disassembling and repairing the fixing device 13, to thereby recover the image forming apparatus 10 from the failure state in a short period of time. Therefore, it is possible to achieve reduction in downtime of the image forming apparatus 10 and reduction in labor cost due to reduced repair time for the service person.

The notification of the failed part (component code) may be performed not only by displaying the component code on the operating panel 1000 but also by transmitting the component code to a call center via the network I/F 1001. The failed part is notified to the call center via the network I/F 1001 at the time of occurrence of a control abnormality, to thereby enable the service person to know the failed part without visiting the installation place of the image forming apparatus 10. As a result, the service person can prepare a substitute for the failed part in advance at the time of visiting the installation place, and quickly repair the image forming apparatus 10 to recover the image forming apparatus 10 from an abnormal state within a short period of time.

In the above-mentioned failure spot identifying processing, the failure spot identifying processing for the signal output system is performed after the failure spot identifying processing for the power supply system, but this order may be reversed. This is because the power supply to the drive circuit system and the output of the control signal are performed in parallel.

Substitution of Component Code

Figures 8, 9:
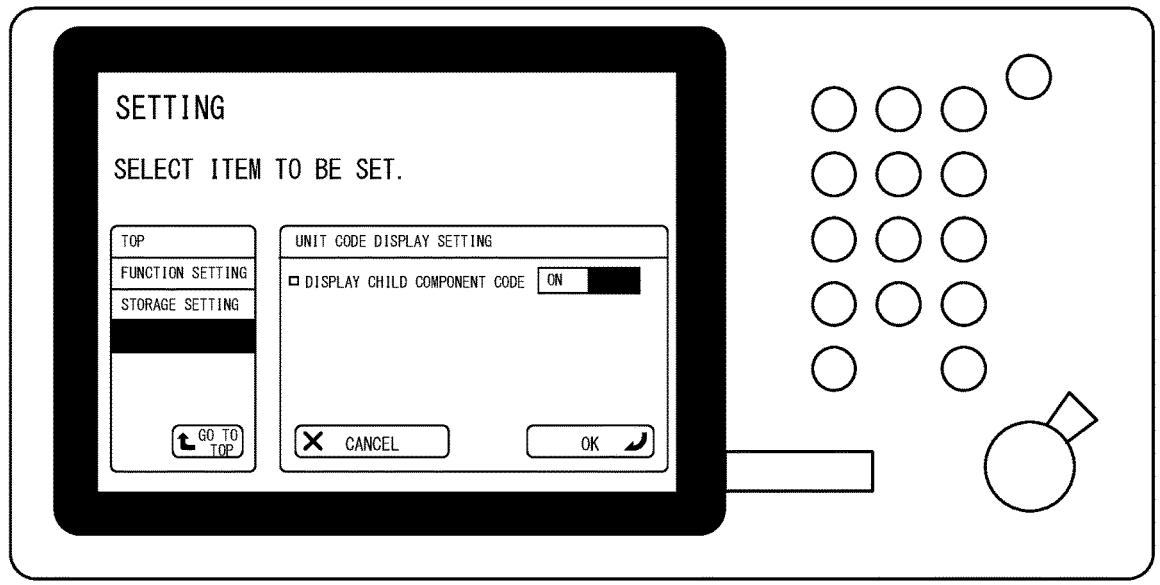
FIG. 8 is a view for exemplifying a setting screen for changing display setting of a component code.
FIG. 9 is an explanatory table of component codes.

In the notification screen shown in FIG. 7A and the notification screen shown in FIG. 7B, different component codes are displayed for the processing results (failed parts) of the same failure spot identifying processing. The child component codes of the child components are displayed in FIG. 7A, and the parent component code of the parent component including the child components is displayed in FIG. 7B. Therefore, as the requirement arises, code substitution (component code substitution) is performed when the notification screen is displayed. With reference to FIG. 8 and FIG. 9, component code substituting processing is described.

FIG. 8 is a view for exemplifying a setting screen for performing display setting of the component code. On this setting screen, the component code displayed as the processing result of the failure spot identifying processing can be selectively set to any one of in unit of a parent component code and in unit of a child component code. In this case, the display setting of the component code is performed depending on whether or not a check box of "DISPLAY CHILD COMPONENT CODE" is checked (turned on).

In a case where the "DISPLAY CHILD COMPONENT CODE" option is ON, as illustrated in FIG. 7A, the image forming apparatus 10 is subjected to the display setting so as to display the child component codes of all the child components identified as the failed parts. In a case where the "DISPLAY CHILD COMPONENT CODE" option is OFF, as illustrated in FIG. 7B, the image forming apparatus 10 is subjected to the display setting so as to display the parent component code of the parent component having the built-in child components identified as the failed parts.

In a case where the service person uses such a setting screen to perform the display setting, the image forming apparatus 10 can notify the failed part by a predetermined method. This enables an occurrence of an abnormality to be notified depending on an unit required by an operating base, for example, a local community or a company, which is operating a service of the image forming apparatus 10. Display setting information indicating details of the display setting is stored in advance in, for example, the RAM 412c of the control unit 410. The display setting information indicates whether notification of failure information is performed in unit of the child component or in unit of the parent component in a case where an abnormality occurs.

FIG. 9 is an explanatory table of component codes. As described above, the component codes are formed of the parent component code assigned to the parent component and the child component code assigned to the child component included in the parent component. A substitution inhibition flag is set for each parent component.

The substitution inhibition flag is information indicating whether or not to permit the child component code assigned to the child component identified as the failed part to be substituted by the parent component code of the parent component including the child component in a case where the failed part is notified. In a case where the substitution inhibition flag is "OFF", the child component code is permitted to be substituted by the parent component code. In the parent component, for example, the fixing device 13, which is capable of collective replacement of child components and is highly convenient, the substitution inhibition flag is set to "OFF". In a case where the substitution inhibition flag is "ON", the child component code is inhibited from being substituted by the parent component code. The substitution inhibition flag is set to "ON" for the parent component in which it is difficult to collectively replace the child components. A component code table shown in FIG. 9, which includes the parent component code of each parent component, the child component code of the child component, and the substitution inhibition flag, is stored in advance in, for example, the RAM 412c of the control unit 410. The component code table is an example of a failure information table.

For example, the fixing device 13 being a parent component includes, as its child components, the film unit 203, the pressure roller 204, and the shutter unit 207. The child components can be collectively replaced by replacing the parent component, and hence the substitution inhibition flag is set to "OFF". A parent component code "100-0000" of the fixing device 13 is associated with child component codes "100-0001", "100-0002", and "100-0003" of the film unit 203, the pressure roller 204, and the shutter unit 207, respectively.

The gear unit 303 does not include internal parts as the child components to be repaired, but is configured as a single parent component. Therefore, in a case where the gear unit 303 is identified as a failed part, a parent component code "200-0000" of the gear unit 303 is notified.

An electric part includes a motor (fixing drive motor 302), for example, as a child component. A parent component code "300-0000" of the electric part and a child component code "300-1000" of the fixing drive motor 302 are associated with each other. An electric board includes a control board, a driver board, and a power supply board, and the like as child components. A parent component code "400-0000" of the electric board and child component codes "400-0001", "400-0002", and "400-0003" of the control board, the driver board, and the power supply board are associated with each other.

The child components of the electric part and the electric board are arranged at various positions in the image forming apparatus 10, and are difficult to be collectively replaced. The substitution inhibition flag is set to "ON" for each of the child components of the electric part and the electric board because the replacement of a single child component is easier than the replacement of the parent component.

Figure 10:
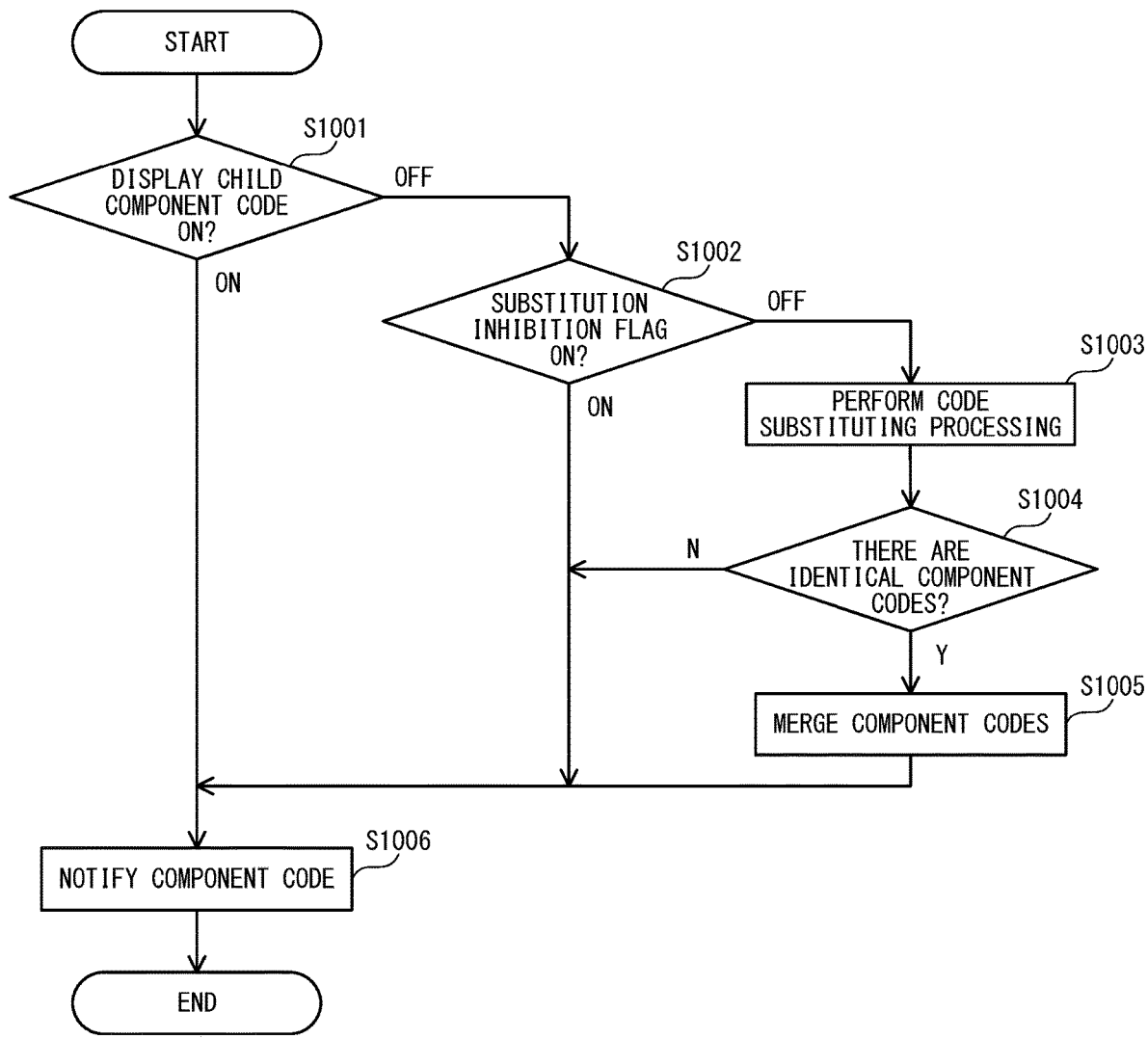
FIG. 10 is a flow chart for illustrating component code substituting processing.

The CPU 412a determines a component code to be notified as a failed part based on the failed part identified in the failure spot identifying processing, the display setting information, and the component code table (substitution inhibition flag). FIG. 10 is a flow chart for illustrating the component code substituting processing. This processing is executed by identifying the failed part in the failure spot identifying processing and determining the component code of the failed part.

The CPU 412*a* determines whether or not the "DISPLAY CHILD COMPONENT CODE" option is set to ON based on the display setting information (Step S1001). In a case where the "DISPLAY CHILD COMPONENT CODE" option is set to ON (Step S1001: ON), the CPU 412*a* notifies the component code of the failed part identified in the failure spot identifying processing (Step S1006). In this case, as exemplified in FIG. 7A, the child component codes of all the child components identified as the failed parts are notified.

In a case where the "DISPLAY CHILD COMPONENT CODE" option is set to OFF (Step S1001: OFF), the CPU 412*a* refers to the component code table to examine the substitution inhibition flag of the failed part identified in the failure spot identifying processing (Step S1002).

In a case where the substitution inhibition flag is ON (Step S1002: ON), the CPU 412*a* notifies the component code of the failed part identified in the failure spot identifying processing without substituting the component code (Step S1006). In a case where the substitution inhibition flag is OFF (Step S1002: OFF), the CPU 412*a* performs code substituting processing for substituting the child component code with the parent component code (Step S1003). The CPU 412*a* refers to the component code table to substitute the child component code of the failed part by the parent component code associated with the child component code. The code substituting processing is performed on the component codes of all the parts identified as the failed parts in the failure spot identifying processing.

The CPU 412*a* determines whether or not there are identical component codes after executing the code substituting processing (Step S1004). In a case where a plurality of parts are identified as failed parts in the failure spot identifying processing, the code substituting processing is performed for each failed part, and hence a plurality of parent component codes are obtained. In such a case, the CPU 412*a* determines whether or not there are identical component codes among the plurality of parent component codes.

When there are not identical component codes (Step S1004: N), the CPU 412*a* notifies the parent component code subjected to the code substituting processing for the failed part identified in the failure spot identifying processing (Step S1006). When there are a plurality of non-identical parent component codes, all the parent component codes are notified. When there are identical component codes (Step S1004: Y), the CPU 412*a* performs component code merging processing for combining the identical component codes into one (Step S1005). The component code merging processing is a processing for notifying one parent component code for the identical parent component codes when a plurality of failed parts are identified in the failure spot identifying processing and there are a plurality of parent component codes obtained through the substitution in the code substituting processing. With the component code merging processing, the component code to be notified is one parent component code when the parent components are identical even in the case of different failed parts. The CPU 412*a* notifies the component code subjected to the component code merging processing (Step S1006).

Through the execution of such component code substituting processing as described above, the component code of the failed part identified in the failure spot identifying processing can be displayed depending on the display setting of the component code. Therefore, convenience for the service person can be improved. The notification of the failed part may be performed not only by displaying the component code on the operating panel 1000 but also by transmitting the component code to a call center via the network I/F 1001. Through the notification of the failed part via the network I/F 1001 when an abnormality occurs, the service person is allowed to know the failed part without going to an installation place of the image forming apparatus 10. The service person can prepare a substitute for the failed part in advance to visit the installation site, and hence the service person can immediately perform a repair. As a result, it is possible to reduce downtime due to the occurrence of an abnormality in the image forming apparatus 10.

Further, the unit of the notification of the code may be caused to differ between the notification to the operating panel 1000 and the notification to the call center. For example, the CPU 412*a* may notify the parent component code by the operating panel 1000 while notifying the call center of the child component code. Through the unit of the notification of the codes at different notification unit, it becomes possible to simplify a service call made by the user and to notify the call center of the information on the failed part in detail. Accordingly, in the image forming apparatus 10 according to at least one embodiment, the unit of the notification of the occurrence of an abnormality can be changed between in unit of the child component and in unit of the parent component.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-192605, filed Oct. 23, 2019, which is hereby incorporated by reference herein in its entirety.

What is claimed is:

1. An image forming apparatus, comprising:
one or more processors, at least one of the one or more processors operating to:
monitor an occurrence of an abnormality;
identify, in a case where an abnormality is detected, a failed part that has caused the abnormality,
a parent component including one or more child components;
a notifier configured to notify failure information indicating a failed part that has caused an abnormality; and
a storage configured to store display setting information indicating whether notification of failure information is performed in unit of a child component and in unit of a parent component;
wherein the at least one of the one or more processors operates to:
control, in a case where the display setting information is set so as to notify the failure information in unit of the parent component, when the failed part is a child component, the notifier to notify the failure information on the parent component including the failed part; and
control, in a case where the display setting information is set so as to notify the failure information in unit of the child component, the notifier to notify the failure information on the failed part.

2. The image forming apparatus according to claim 1, further comprising a setting unit configured to manually set the display setting information,
wherein the storage is configured to store the display setting information set by the setting unit.

3. The image forming apparatus according to claim 1, wherein the at least one of the one or more processors operates to control, in a case where the display setting information is set so as to notify the failure information in unit of the parent component, when the failed part includes a plurality of failed parts, the notifier to notify pieces of failure information on respective parent components corresponding to the plurality of failed parts.

4. The image forming apparatus according to claim 3, wherein the at least one of the one or more processors operates to control the notifier to notify, as one piece of failure information, identical pieces of failure information among the pieces of failure information on the respective parent components corresponding to the plurality of failed parts.

5. The image forming apparatus according to claim 1, further comprising a memory configured to store a failure information table in which a first piece of failure information assigned to the parent component and a second piece of failure information assigned to the child component are associated with each other,
    wherein the at least one of the one or more processors operates to refer to the failure information table to substitute the second piece of failure information on the failed part by the first piece of failure information on the parent component associated with the second piece of failure information, and control the notifier to notify the first piece of failure information subjected to the substitution.

6. The image forming apparatus according to claim 5, wherein the failure information table includes a substitution inhibition flag indicating whether to inhibit the second piece of failure information from being substituted by the first piece of failure information, and
    wherein the at least one of the one or more processors operates to substitute the second piece of failure information, which is not inhibited by the substitution inhibition flag from being substituted, by the first piece of failure information.

7. The image forming apparatus according to claim 6, wherein the substitution inhibition flag indicates that the second piece of failure information is inhibited from being substituted by the first piece of failure information on the parent component in which it is difficult to collectively replace child components.

8. The image forming apparatus according to claim 1, further comprising a display configured to display information,
    wherein the notifier is configured to display, on the display, the failure information indicating the failed part.

9. The image forming apparatus according to claim 1, further comprising a communicator configured to perform communication to/from an external device,
    wherein the notifier is configured to transmit the failure information indicating the failed part to the external device via the communicator.

10. The image forming apparatus according to claim 1, further comprising:
    a display configured to display information; and
    a communicator configured to perform communication to/from an external device,
    wherein the notifier is configured to display, on the display, the failure information indicating the failed part, and to transmit the failure information indicating the failed part to the external device via the communicator, to thereby control the selection between the unit of the parent component and the unit of the child component to differ between the failure information displayed on the display and the failure information transmitted to the external device.

11. The image forming apparatus according to claim 10, wherein the at least one of the one or more processors operates to control, in a case where the failed part is a child component, the notifier to:
    display, on the display, the failure information on the parent component including the failed part; and
    transmit the failure information on the failed part to the external device via the communicator.

\* \* \* \* \*